(No Model.)
A. W. LIVINGSTON.
CULTIVATOR.
No. 282,540. Patented Aug. 7, 1883.
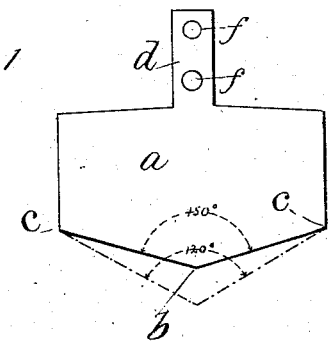
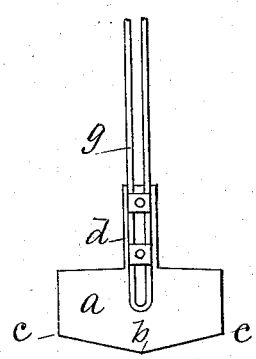
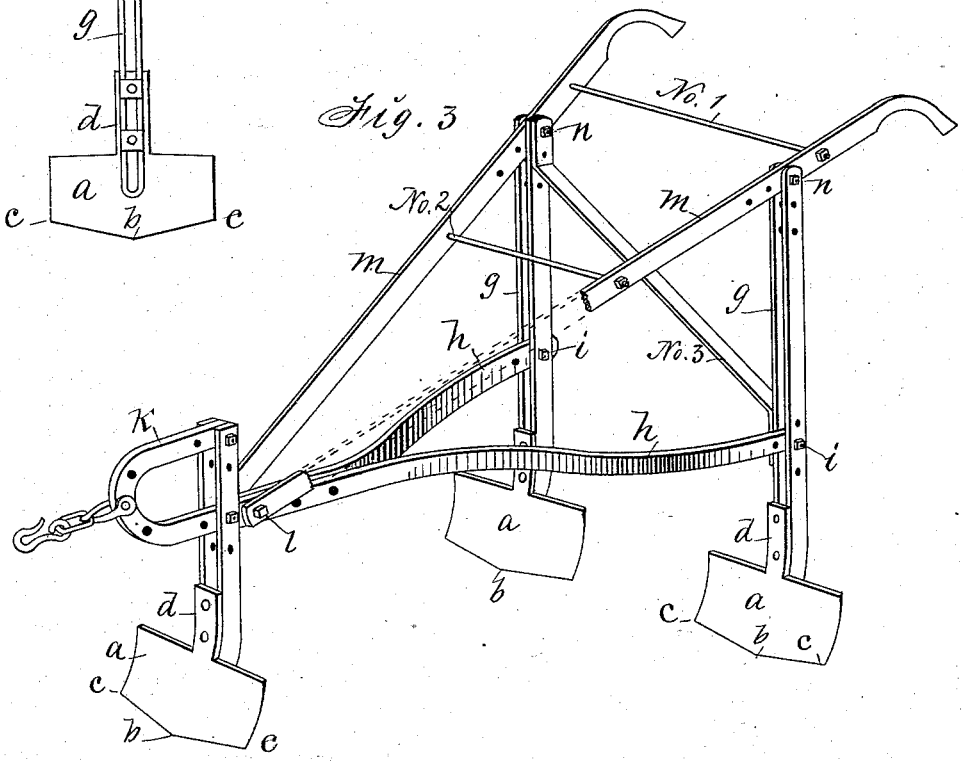
Witnesses:
R. H. Orwig.
E. L. Hendricks.
Inventor:
Alexander W. Livingston,
By Thomas & Orwig, Attorney.

UNITED STATES PATENT OFFICE.

ALEXANDER W. LIVINGSTON, OF DES MOINES, IOWA.

CULTIVATOR.

SPECIFICATION forming part of Letters Patent No. 282,540, dated August 7, 1883.

Application filed February 15, 1883. (No model.)

*To all whom it may concern:*

Be it known that I, ALEXANDER W. LIVINGSTON, of Des Moines, in the county of Polk and State of Iowa, have invented an Improved Garden-Cultivator or Machine-Hoe, of which the following is a specification.

The object of my invention is to provide a strong and durable cultivator that can be readily adjusted, and that is specially adapted to be operated by means of a horse, for the purpose of dispensing with the use of a hoe in cultivating garden and field crops planted in rows.

It consists in forming a frame with a rigid clevis at its front end, and combining adjustable standards carrying detachable shovels and adjustable handles therewith, as hereinafter fully set forth.

Figure 1 of my accompanying drawings is a top view, showing the blank form of a shovel adapted to be used on my frame. Fig. 2 is a detail view, showing the form of my standard and a shovel attached. Fig. 3 is a perspective view of my adjustable frame and complete cultivator or machine-hoe. Together these figures clearly illustrate the construction, operation, and utility of my complete invention.

$a$ is the body of the shovel-blank, preferably cut from steel plate about eight (8) inches wide and four (4) inches high, and slightly inclined from the center of its bottom edge outward and upward to its corners at its sides. By curving the lower portion of the blank thus shaped slightly forward, its elongated and central point, $b$, will be brought on the same level and plane with the lower corners, $c\ c$, when attached to my cultivator-frame, as required to produce a double-edged bottom, and a cutter that will penetrate the soil an equal depth across its entire track and sever the roots of grass and weeds in its track by a draw cut, and at the same time present a square flat surface to the front, against which the loosened ground will press and rise to fall over its top, to be evenly distributed on its rear side over the same track and area from whence it was cut and scraped.

$d$ is a narrow shank about three (3) inches long, formed integral with the top and center of the blank or shovel $a\ b\ c$, or fixed thereto by means of rivets or other suitable way. It has perforations $f$ in its center, through which screw-bolts are readily passed to clamp it to a standard.

$g$ (shown clearly in Fig. 2) represents one of my standards, formed by simply doubling a flat bar of iron in such a manner as to leave a uniform and narrow space extending upward its entire length from its closed bottom end, to adapt it for receiving and adjusting the shovels and parts of the cultivator-frame. It may vary in size, length, and weight as desired.

$h\ h$ (shown in Fig. 3) are laterally-bent iron beams made from iron bars, corresponding in size with the standards $g$, and detachably and adjustably connected at their rear ends by extending them through two of my standards of uniform length, and then fastening them thereto by means of screw-bolts $i$, passed through transverse perforations in the beams and standards.

$k$ is a clevis, formed by bending and perforating a bar of iron in such a manner that its lower arm will be longer than the upper, and adapted to be placed between and overlapped by the front ends of the beams $h$, to which it is clamped and adjustably and detachably fastened by means of a screw-bolt, $l$.

$m\ m$ are handles of common form, adjustably and detachably connected at their lower ends with the beams $h$ and clevis $k$ by means of the connecting-bolt $l$ and transverse perforations, and at their upper ends with the top ends of the two parallel standards $g$ by means of transverse perforations and screw-bolts $n$. Nos. 1, 2, and 3 represent detachable braces. A shorter standard $g$, bolted to the upper and lower arms of the clevis $k$ in such a manner that it can be adjusted vertically and longitudinally relative thereto and the complete frame, and detached at pleasure, completes the construction of my knockdown cultivator-frame.

In the practical operation of my garden-cultivator or machine-hoe thus constructed I can readily adjust the three vertical standards $g$, that carry the double-edged short and wide shovels at their bottoms, in such a manner as to vary the angles of the said shovels relative to the ground-surface that is to be scraped or hoed to loosen the surface soil and to destroy grass and weeds growing between the plants that are to be cultivated. By bringing the standards into a perpendicular position the cutting-edges of the shovels will penetrate deeply into the ground. By inclining the standards rearward the shovels will be caused to penetrate less deep and scrape and stir the surface soil only. By simply varying the degree of angle in the standards the depth of the penetration of the shovels into the ground will be regulated, and a little experience, observation, and judgment will enable any practical gardener to adjust them to suit the varying conditions of the soil, the plants, and the grass and weeds that are to be destroyed by dragging my machine around and contiguous to a row of plants by means of a horse attached to the clevis $k$ at the front end.

I claim as my invention—

1. In a cultivator, the frame consisting of the curved beams $h$, united rigidly at their front ends and curved upward and backward to produce a clevis and a brace for the standard, substantially as shown and described.

2. The combination of the beams $h$, curved at their front ends to produce a clevis and brace, $k$, the standards $g$, adapted to carry detachable shovels, the handles $m$, and a brace, 3, substantially as and for the purposes set forth.

ALEXANDER W. LIVINGSTON.

Witnesses:
 THOMAS G. ORWIG,
 W. C. FARNSWORTH.